(12) United States Patent
Beecroft et al.

(10) Patent No.: US 8,971,186 B2
(45) Date of Patent: Mar. 3, 2015

(54) METHOD AND DEVICE

(75) Inventors: Jon Beecroft, Bristol (GB); David Charles Hewson, Bristol (GB)

(73) Assignee: Cray UK Limited, Reading (GB)

( * ) Notice: Subject to any disclaimer, the term of this patent is extended or adjusted under 35 U.S.C. 154(b) by 50 days.

(21) Appl. No.: 13/704,350

(22) PCT Filed: Jul. 15, 2011

(86) PCT No.: PCT/GB2011/051336
§ 371 (c)(1),
(2), (4) Date: Jan. 12, 2013

(87) PCT Pub. No.: WO2012/007766
PCT Pub. Date: Jan. 19, 2012

(65) Prior Publication Data
US 2013/0107719 A1    May 2, 2013

(30) Foreign Application Priority Data

Jul. 15, 2010  (GB) .................................. 1011910.5

(51) Int. Cl.
*H04L 12/26* (2006.01)
*H04L 12/801* (2013.01)
*H04L 12/851* (2013.01)
*H04L 12/825* (2013.01)
*H04L 12/823* (2013.01)
*H04L 12/933* (2013.01)
*H04L 12/931* (2013.01)

(52) U.S. Cl.
CPC ............... *H04L 47/11* (2013.01); *H04L 47/24* (2013.01); *H04L 47/266* (2013.01); *H04L 47/32* (2013.01); *H04L 49/101* (2013.01); *H04L 49/205* (2013.01); *H04L 49/501* (2013.01)
USPC .......................................... 370/235; 370/236

(58) Field of Classification Search
USPC .................................... 370/236, 235
See application file for complete search history.

(56) References Cited

U.S. PATENT DOCUMENTS

| 5,859,837 | A  | * | 1/1999  | Crayford ....................... 370/230 |
| 5,923,654 | A  |   | 7/1999  | Schnell |
| 5,936,962 | A  |   | 8/1999  | Haddock et al. |
| 6,320,870 | B1 | * | 11/2001 | Thaler ........................... 370/445 |
| 7,643,493 | B1 |   | 1/2010  | Sayrafian-Pour |
| 7,773,592 | B1 |   | 8/2010  | Dropps et al. |
| 7,995,618 | B1 | * | 8/2011  | Bjerregaard ................... 370/503 |
| 2006/0092836 | A1 | * | 5/2006 | Kwan et al. ................... 370/229 |

FOREIGN PATENT DOCUMENTS

EP      0505779 A2    9/1992
WO      WO-9641456 A1  12/1996

* cited by examiner

*Primary Examiner* — Sai-Ming Chan
(74) *Attorney, Agent, or Firm* — Craig J. Lervick; Larkin Hoffman Daly & Lindgren, Ltd.

(57) ABSTRACT

A method and system is provided for efficiently controlling data packet routing through a switching element which has a first plurality of input ports and a second plurality of output ports. The method and system are configured for detecting issuance of a first congestion indicator from an output port of the switching element which is related to a first routing request received from a first input port. Reassertion of the first routing request is then carried out after a first time period. Similarly, the method and system are configured for detecting issuance of a second congestion indicator from the output port of the switching element, which is related to a second routing request from a second input port. Reassertion of the second routing request is then carried out after a second time period. In addition, the first and second time periods are set up so that reassertions of the first and second connection requests occur substantially simultaneously.

16 Claims, 4 Drawing Sheets

METHOD AND DEVICE

BACKGROUND

The present invention generally relates to a synchronization mechanism for reassertion of connection requests within a data network switch. In particular, the present invention is concerned with a mechanism enabling synchronization of reassertion of requests to connection over a component such as a network switch after initial requests have been rejected due to network congestion.

Data communication networks are normally constructed using a plurality of component elements such as network switches. There is a variety of types and sizes of switching elements. In general, larger networks usually require a number of switching elements linked together to form a multi-stage network. The performance of such data networks can be measured using a large number of parameters which include, amongst other things, bandwidth, latency, addressing and standards compliance.

Multi-stage networks can suffer from network data packet congestion which occurs when a number of different data packets are directed into a single switching element, with each data packet instructed to leave that switching element using the same network link as the other data packets have been instructed to use. The network link is unable to process all of the data packets at the same time, and so congestion occurs. Switching elements typically contain some buffering that allows congested data packets to be stored until the congested exit link from the switch is free to transmit the backlog of data packets. While a data packet is waiting for a congested exit link to become available, the delivery latency of that data packet is increasing.

Network latency is unavoidable when the traffic patterns of data travelling across a network are not predictable or are apparently random. However, the latency of individual data packets or data packet streams can to some extent be controlled. For example, if each switching element is faced with a number of data packet sources each trying to reach a particular egress link from the switch, the switch can make a choice as to which packet to next route to that exit link.

Sometimes network protocol includes priority and each data packet is provided with a priority status whereby higher priority packets should be delivered first. Some switching elements operate a fair delivery system to the data packets arriving from different input links based upon the priority assigned to the packets. Whilst such a switching element can prioritize the packets based on their priority, the switching element cannot take into consideration how any given data packet came to arrive at this switching element. In some cases, if the switching element has network links connected directly to the ingress edge of the network, the switching element may be the first switching element at which the data packet has arrived. However, for some data packets arriving at the same switching element on a link connected into the internal switch fabric of the network, they may have already traversed many other switching elements, through many stages of the network, before arriving at this particular switching element. Furthermore, these data packets may have endured network congestion at each switching element stage of their journey. True network fairness would involve a switching element giving the network traversing data packets priority over the data packets new to the network. One way to improve the total network fairness in such a situation is to give each data packet an age, or date of birth, as it enters the network. Switch elements can then use the packet age in their prioritization of data packets with older packets that have been in the network for longer giving them priority over younger packets that have only just entered the network.

Many network protocols include flow control to prevent network buffers overflowing. Any buffer has a finite size. A buffer associated with an ingress link is used to store packets until an egress link becomes available for connection and transmission of a data packet. If data packets continue to be received for a particular egress link and the egress port associated with that egress link is overcommitted with other traffic from other links, or the egress port it is unable to transmit at the rate the data is being received then eventually the input buffer will become full. At this point either packets that are received on this link have to be discarded or a method to stop them arriving at the buffer must be used.

Flow control is a commonly used method used to prevent buffer overflow. When a data packet is received after transmission across a network, a token is returned in the opposite direction to the received packet to instruct the link partner to stop transmitting. This token can be in the form of a control packet, particular link encoding or even sideband additional wires. Sometimes the token is a signal instructing the transmitter to stop transmitting until told to re-start. In other networks, the token is an instruction to the transmitter to stop transmitting for a period of time and, in some cases of congestion, the instruction to stop transmitting may need to be repeated later. In communication protocols this type of flow control signal is often called a Xoff.

Some network protocols layer multiple data streams over the same link. When this occurs it is possible for the flow control, if it exists, to be independent for each of the data streams. If multiple data flows are using an egress output port, one of the data streams could be heavily congested, with the flow control indicating to the link partner for that data stream to stop transmission, while other data streams are either idle or flowing freely. The other data packet flows should be able to continue to deliver packets to the egress port while the blocked flow is waiting for the flow control to release the channel.

When flow control is used an egress port can be blocked for a significant period of time. When the egress port becomes unblocked it is especially important that the most appropriate packet is selected to be transmitted as an output port that has been blocked is likely to become blocked again as a backlog of data packet to be transmitted are still likely to be present.

There are many different implementations of switching elements. In some cases, large, multi-ported, memory systems are used. These have a number of independent read and write ports and the memory performs both the switching function and the input buffering function. For high performance networks with high bandwidth links the design of the read/write interface to and from such a memory system can be challenging. Other switching element implementations use a crossbar switch with separate buffers for each of the links. It is also possible to have a switching element implementation comprising a combination of multi-ported memories and a crossbar switch where the multi-ported memories will support a small number of links and the crossbar switch is used to link the multiple memories together. All these methods of implementation can be faced with the same problem of arbitrating many separate packet streams being delivered onto a single egress port.

It is usually desirable to maximize the number of links an individual switch is able to support. This has the effect of reducing the total number of switching elements needed in the multi-stage network and in so doing reduces the total cost of the network. It also reduces the total number of links, improves the overall reliability and again reduces the cost of the network. Reducing the total number of links and switching elements within a network can also significantly reduce the power consumption of the network.

However increasing the number of links on a switch increases the complexity of the switch. Such complex switch devices tend to require more logic gates to implement and this can lead to relatively large silicon chips. The problems associated with performing an accurate arbitration decision against many ingress ports for each output port is increased in larger chips. This is especially true if the packet priority and or age values are being correctly honored and the output ports have multiple data flows, channels or data lanes. Furthermore, the input ports will be physically distant, in silicon terms, from the outputs they are trying to connect with.

An example of the issues which can arise will be described with reference to FIG. 1 which shows a schematic diagram of a cross bar switch 10. The crossbar switch 10 is a block of logic used to switch data concurrently from a number of input data streams to a number of output data streams. The cross bar switch 10 is provided with eight inputs 12a-12h, shown as rows, and eight outputs 14a-14h shown as columns however it will be appreciated that much bigger crossbars can be constructed with many more inputs and outputs and wide data paths can be used to increase the bandwidth increasing the size of the crossbar structure. Switch points 16aa-16hh are located at the respective intersections of the rows 12a-h and columns 14a-h. When a switch point, in this case switch point 16fg is closed a connection is made from input 12f to output 14g as shown by the black dot in FIG. 1. Only one switch point is allowed to be connected on a given output column at any one time, however, providing this is the case, multiple outputs can be connected to corresponding inputs at any one time.

In some cases, a single input to a crossbar switch make request to connect to a particular output however in the case of floods, broadcasts and multicasts the single input will request connection to a set of outputs. As well as specifying the output port, a connection request can also specify the output data flow channel at the output port on which the packet should be transmitted on. The input connection request will be provided with a priority and or age value and the output port will use an arbitration method to select the highest priority/oldest packet to connect with.

If flow control is being used on the output's egress port then the output may have to signal to inputs requesting connection that a connection cannot be made because the output flow has been stopped by a full buffer on the egress ports link partners' ingress port. However, this may only be occurring on one of the output's data flows and the other data flows may still be able to accept more data packets.

One recognized way of dealing with this type of problem is to reject the failing connection with a blocked response signal that indicates another attempt at connection should be made later. The input making the connection request would then inhibit the request for a period of time during which that input's connection to the crossbar is free to try to request a connection for another data packet from a different data flow perhaps to a different output. After a period of time the input will retry the original connection request and would either be successful or be made to wait again.

The problem with this approach is that for the input making the request for connection, winning the connection to the congested output's data flow becomes a lottery. There may be many inputs all trying to send data packets to this output and the first input to make a connection request after the output's data flow status has transitioned from stopped to running will be the input that manages to make the connection and send a packet across the data flow with no regard given to packet priority or age in deciding which input the output connected to.

In FIG. 2 there is a schematic representation of an input and output status timeline, associated with connection requests in a network switch such as that shown in FIG. 1, which illustrates this problem. As can be seen, inputs 12a, 12b and 12c are each trying to connect to an output 14d. In this example input 12a has a medium priority request, input 12b has a high priority request and input 12c has a low priority request. The requests are made when new data packets arrive at the respective inputs 12a-c and need to be routed to output 14d. In this example, input 12a's connection request is asserted first. Input 12a makes the request to the output 14d only to find that a blocked signal is being asserted by output 14d. This forces input 12a to de-assert its connection request as there may be other work input 12a could progress such as transmitting other data packets to another output. Input 12b then asserts its high priority request but again is forced to de-assert because the output 14d is still asserting a blocked signal. The output 14d then receives a signal from its link partner (not shown) that it is able to transmit some more data, the timing of this signal arriving is completely unpredictable as it depends on how the packet data is being accepted by the link partner of output 14d. Upon receipt of this signal, output 14d de-asserts the blocked status signal. The low priority request from input 12c then gets lucky and happens to be asserted just after the blocked status is removed from output 14d. Input 12c therefore successfully connects to output 14d despite being the lowest priority requestor. Inputs 12a and 12b subsequently retry their connection requests but now find they cannot connect to output 14d because input 12c is already connected.

As the output 14d did not have all the relevant requests available, at the same time, in order to perform a comparison of priority and/or age of the data packets, these factors could not be taken into account in assigning the next connection. With requests arriving at various times, then being rejected and made to wait for a period of time, the probability of all the requests being re-asserted together is unlikely.

However, ensuring that the highest priority/oldest packet are chosen for transmission across a switch is especially important when output data flows become blocked because these are the exact conditions when old packets are generated within a network. Innetworks where maximum latency is an important parameter, and if priority and/or age are included in the network protocol, then it is critical that blocked resources are managed carefully and the highest priority request is always the next to be selected.

It can therefore be seen that there is a need for a mechanism that can synchronize reassertion of connection requests within a network switch. It would be convenient if such a mechanism could also be able to maintain optimum connection functionality when no reassertion of request is required.

SUMMARY

An object of the present invention is to obviate or mitigate at least one of the aforementioned problems.

According to one aspect of the present invention, there is provided a method for controlling data packet routing through a switching element having a first plurality of input ports and a second plurality of output ports, the method comprising the steps of detecting issuance of a first congestion indicator from an output port of the switching element, the first congestion indicator relating to a first routing request from a first input port of the switching element, allowing reassertion of the first routing request after a first time period, detecting issuance of a second congestion indicator from the output port of the switching element, the second congestion indicator relating to a second routing request from a second input port of the switching element, allowing reassertion of the second routing request after a second time period, wherein the first and second time periods are such that reassertions of the first and second connection requests occur substantially simultaneously.

The reassertions of the first and second routing requests may occur in a single clock cycle.

Such synchronized reassertion of routing requests enables relative timing of routing requests to be maintained.

In one example, the method further comprises generating respective synchronization signals for the reassertion of the first and second routing requests. Such a synchronization signal provides a convenient way to transmit the synchronization information.

In an example, the first and second congestion indicators are generated in dependence upon a link status signal relating to congestion of a link from the output port concerned, and the method further comprises delaying expiry of the link status signal until the end of the first and second time periods. Such delaying of the expiry of the "link busy" signal means that the first and second requests will not be overtaken by a third request that happens to arrive between the normal expiry of the busy signal and the reassertion time determined by the synchronization method.

Such a method may further comprise determining an allowed route from the reasserted first and second routing requests in dependence upon a parameter relating to the routing 5 requests. The parameter may include a priority level and/or a request age. Using such a parameter allows the output to determine the most important request to accept.

BRIEF DESCRIPTION OF THE DRAWINGS

These and other aspects of the present invention will be more clearly understood from the following description and, by way of example only, and with reference to the following figures, in which.

DETAILED DESCRIPTION

Figure 1:
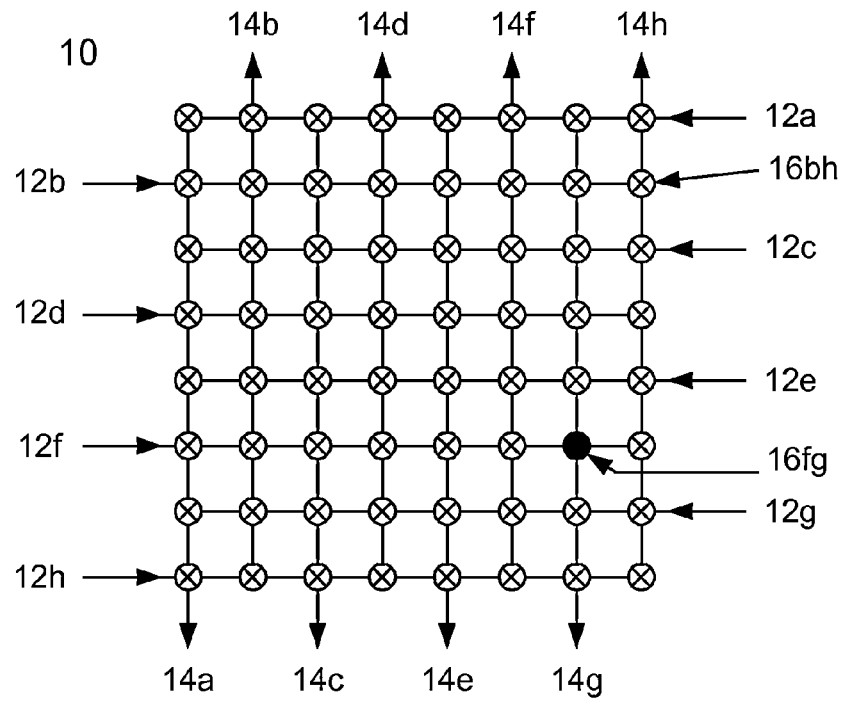
FIG. 1 is a schematic diagram of a known crossbar switch.
Figure 2:
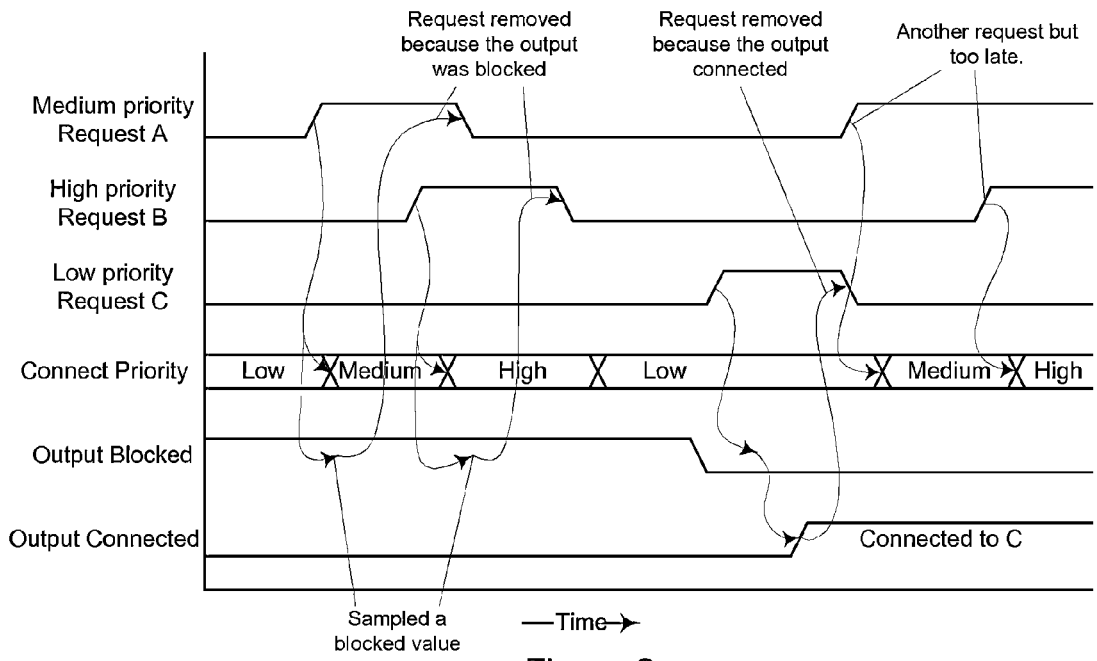
FIG. 2 is a schematic diagram of a status timeline of the crossbar switch of FIG. 1.
Figure 3:
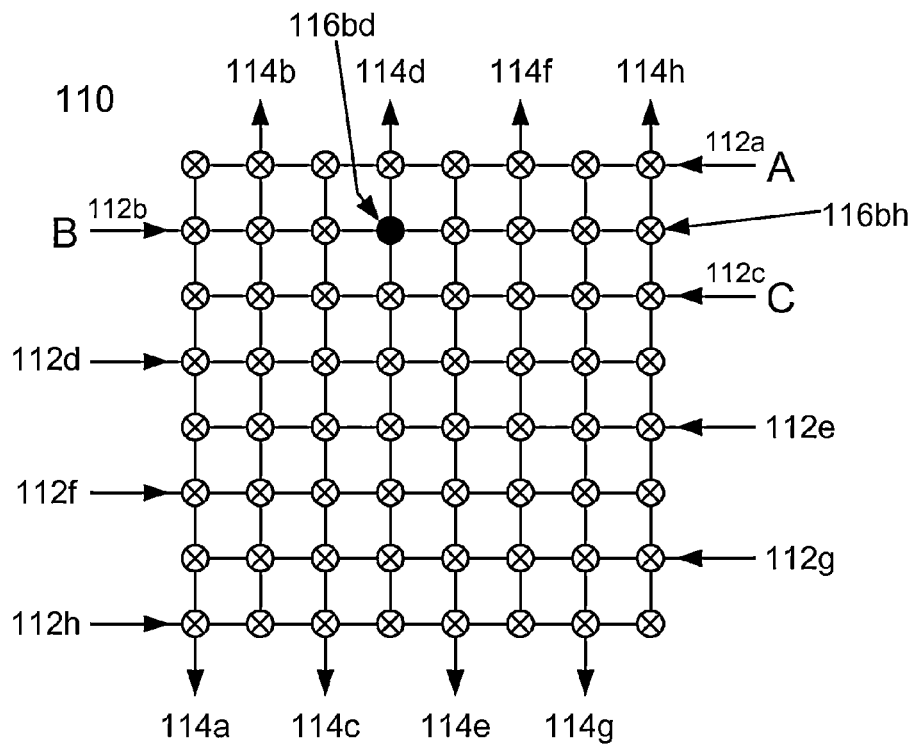
FIG. 3 is a schematic diagram of a crossbar switch in which an embodiment of the mechanism of the present invention is implemented.

FIG. 3 shows a network switching element, in this case cross bar switch 110 provided with eight inputs 112a-h, shown as rows, and eight outputs 114a-h shown as columns. Switch points 116aa-hh are located at the respective intersections of the rows 112a-h and columns 114a-h. In this example, inputs 112a, 112b and 112c assert respective requests to connect with output 114d. The switch 110 is provided with a synchronization mechanism (not shown) which enables the synchronization of the reassertion of requests from inputs 112a-c to connect with an output 114d after the initial connection requests have been rejected because output 114d was blocked when the initial requests were made.

Figure 4:
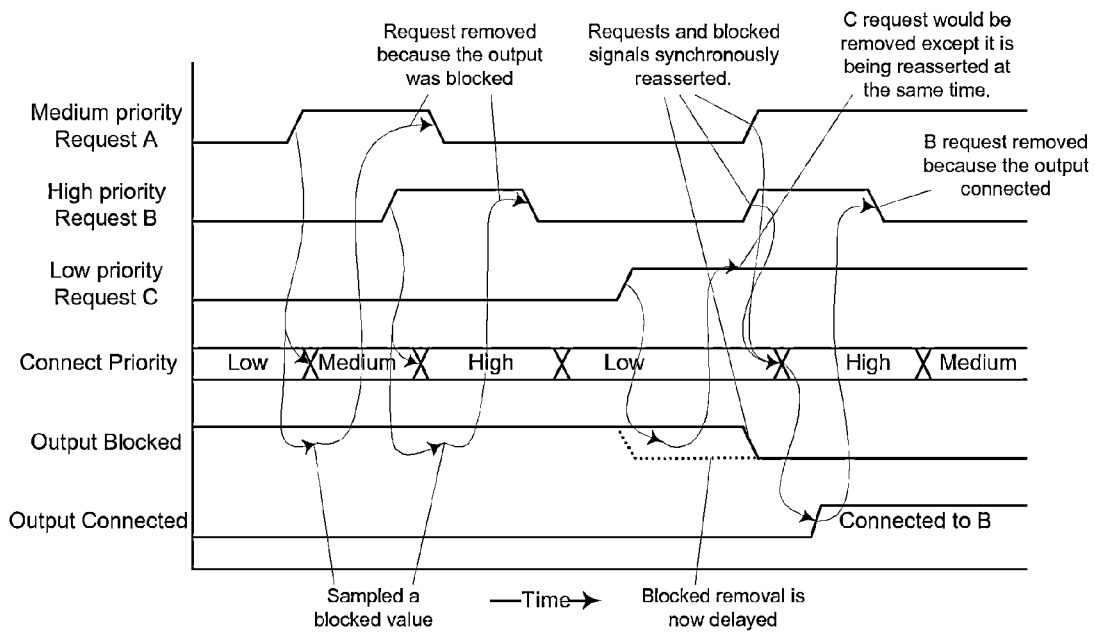
FIG. 4 is a schematic diagram of a status timeline of the crossbar switch of FIG. 3.

FIG. 4 illustrates an example input and output status timeline for the network switching element 110 of FIG. 3. In this example, input 112a has a medium priority request, input 112b has a high priority request and input 112c has a low priority request. The requests are made when new data packets arrive at the respective inputs 112a-c and need to be routed to output 114d. Input 112a's connection request is asserted first only to find that a blocked signal is being asserted by output 114d. This causes input 112a to de-assert its connection request. Input 112b then asserts its high priority request but again is caused to de-assert because the output 114d is still asserting a blocked signal. As the initial connection requests from inputs 112a and 112b occur while the output 114d has a blocked signal asserted, the synchronization mechanism generates a synchronization signal to cause the inputs 112a and 112b to wait for respective amounts of time such that reassertion of the connection requests occurs in the same clock cycle as each other.

Figure 5:
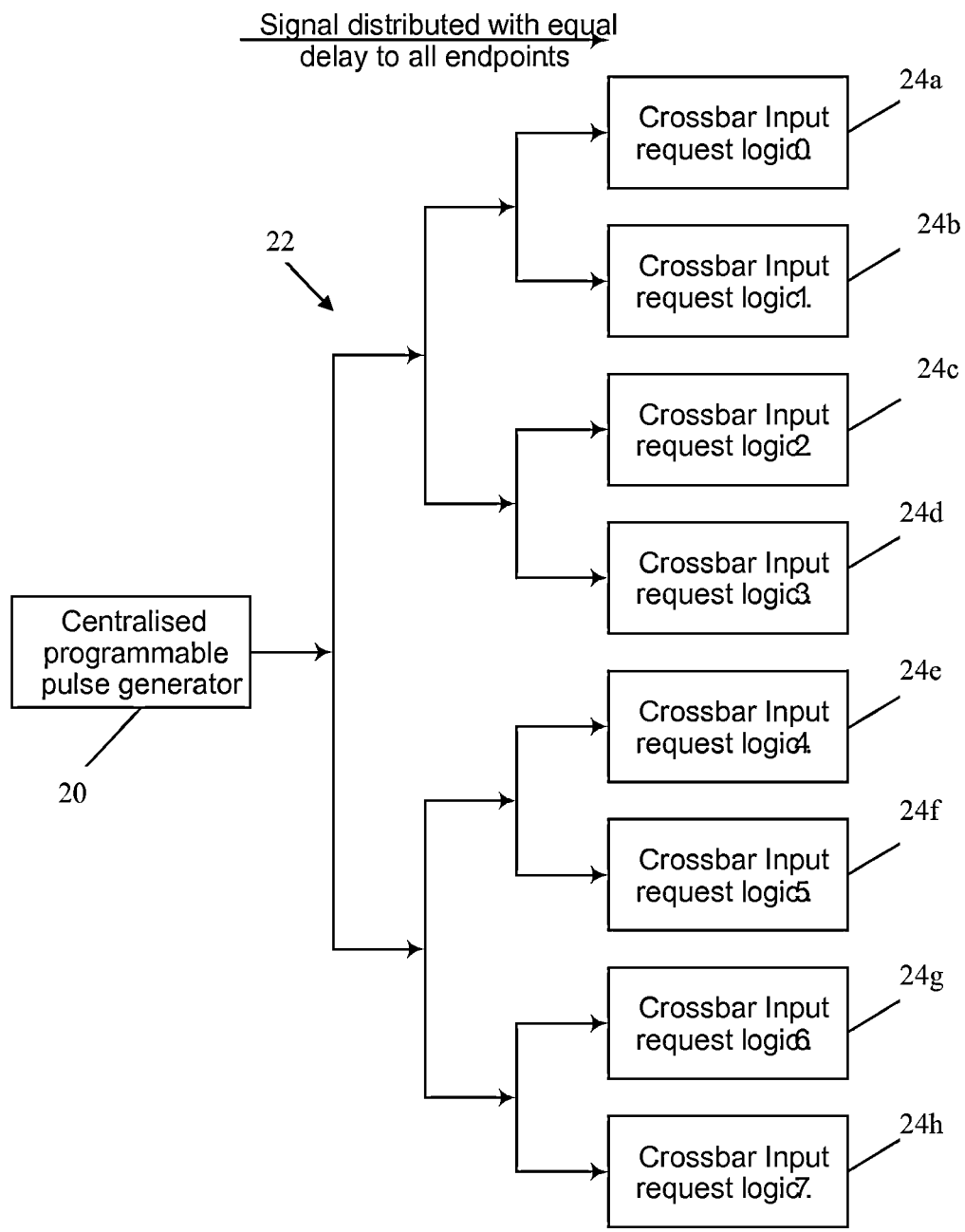
FIG. 5 is a schematic of a synchronous signal distribution.
Figure 6:
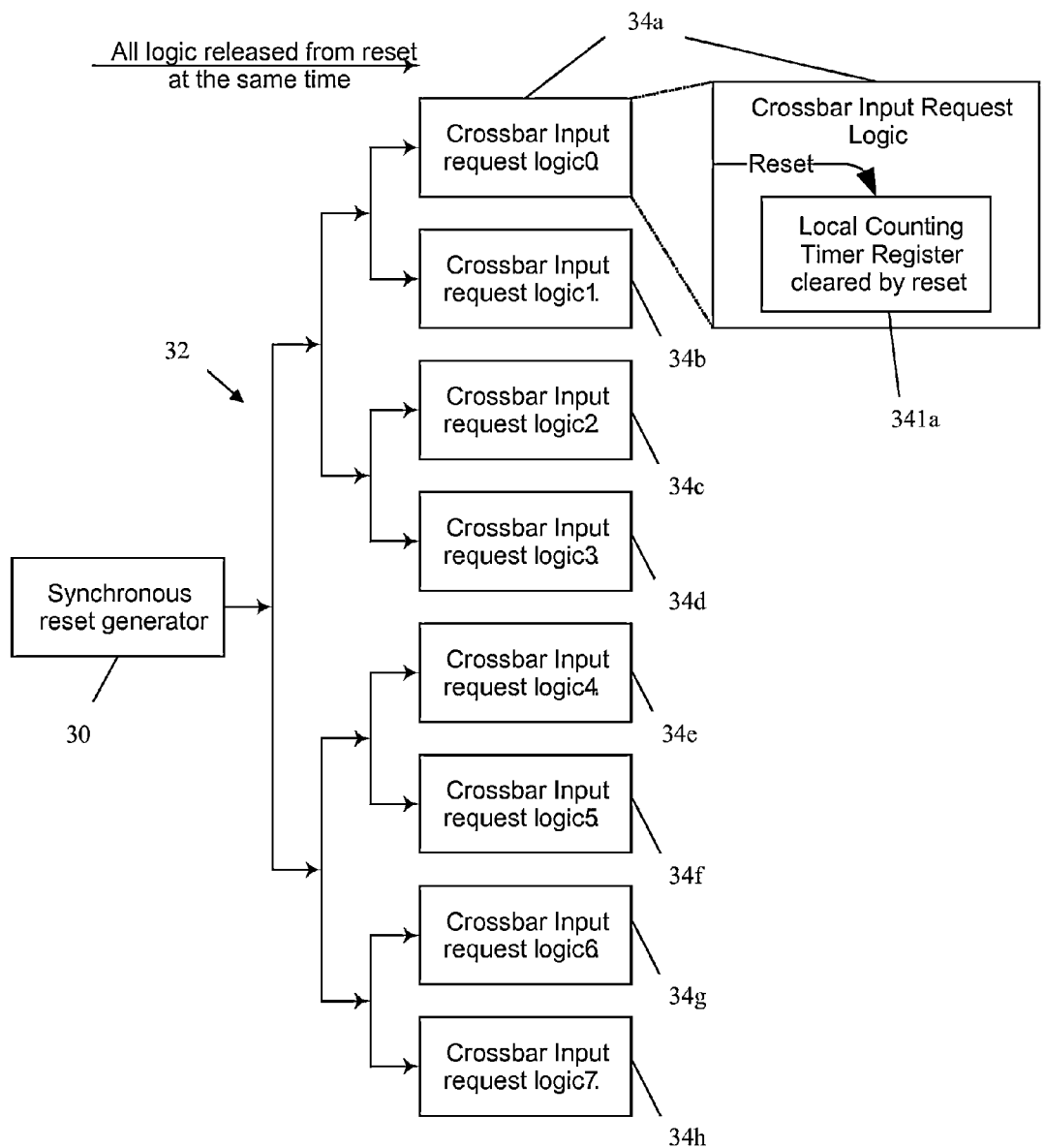
FIG. 6 is a schematic of a set of synchronized counting timers.

The synchronization signal can be transmitted to the inputs using a globally available, chip wide, signal wire. FIG. 5 gives an example implementation of such a mechanism. A single pulse generator 20 that could be programmable to allow the frequency of pulses to change has its output 22 distributed across the device so that the delay to each of the blocks of crossbar input logic is the same. This distribution delay may be less than a clock cycle for smaller chips or may be a number of clock cycles for larger chips but the delay should be the same for each endpoint. If multiple clock cycles are required then the signal should pass through the same number of flip-flops for each crossbar input logic block 24a, ..., 24h. Alternatively, the synchronization could be transmitted using a set of synchronized timing units. FIG. 6 gives an example implementation of synchronized clocks. The chip wide reset signal is distributed with equal delay to all functional units 34a, ..., 34h of the chip. Each functional unit 34a, ..., 34h requiring synchronized operation has a local counter or clock register 341a, ..., 341h. All counter registers 341a, ..., 341h are cleared to zero when reset is applied. When reset is released they all then start to increment at the same rate. All clock registers 341a, ..., 341h across the whole chip will then hold the same changing value.

Meanwhile, in this example, a connection request from input 112c is asserted at the same time as the output 114d receives notification that its link partner (not shown) is able to transmit more data. However, since the synchronization mechanism has caused two connection requests to wait for reassertion, the synchronization mechanism extends the assertion of the output 114d blocked signal until the connection requests from inputs 112a and 112b are re-asserted. The connection request from input 112c would normally be caused to be de-asserted. However, in the present embodiment, the synchronized reassertion point for inputs 112a and 112b coincides with the signal removal point for 112c, and so the synchronization mechanism enables the connection request for input 112c to remain asserted.

The synchronization mechanism thus enables the re-asserted request signals and a new assertion signal to occur in the same clock cycle. The output connection arbiter now has all three request signals asserted simultaneously and thus is able to choose the input 112b associated with the highest priority request to make the next connection with the output 114d.

There are a number of different arbitration schemes that can be used to make an output connection arbiter but all should appear reasonably fair for a number of different requests with the same level of priority. There are two common techniques used to provide fair arbitration. Least recently used (LRU) arbiters provide a fair selection between many requestors of equal priority. From any given set of requests the LRU arbiter would always grant access to the requestor that had used the resource least recently. Although LRU arbiters give very good results they can be difficult to implement, especially if the arbiter has a large number of requesting inputs, because a large amount of state is required to accurately store the complete history of previous requests. Manipulating and interpreting this state can be difficult especially as all arbiter requests must be compared against all the history state. Round robin arbiters are not as fair as LRU arbiters but they can be much easier to implement especially if the arbiter has a large number of inputs or is physically distributed across a large area of logic. A round robin arbiter uses a simple priority encoding where the last requestor to successfully access the resource is given the lowest priority. Round robin arbiters are usually implemented in a ring that is broken into a priority encoding scheme by the last successful requestor. They give fair arbitration if a largely unchanging set of requestors are trying to select the resource however they can become unfair in a way that LRU arbiters are not if the set of requestors are continually changing.

If the requests going to the arbiter have a priority value then an additional mechanism is required to qualify the request signals before they are presented to the fair arbiter. This mechanism needs to find the highest priority request or requests and mask out all other requests with a lower priority. This can be implemented using a single count value that tracks the highest priority value. All the requestors can compare their priority value against the count value. If their priority value is greater than the current count value then they can request the current count is incremented. If their priority value is greater than or equal to the count value then they are able to present their request to the fair arbiter. If their priority value is less than the current count value then they must mask their request from the fair arbiter. The logic controlling the count value must increment its value if any requestor has asserted the increment signal provided it is not at the maximum value else it must maintain the current count value provided at least one requestor is asserting a request signal. It must decrement the count value if no requests are asserted provided the count value is not at the minimum value.

The synchronization signal, generated by the synchronization mechanism, ensures that after an input connection request has been rejected because the output it was trying to connect with was blocked, the input concerned will wait for an appropriate amount of time before reasserting the same request to try again for the same output.

The synchronization mechanism also ensures that, when the connection request is reasserted, any other inputs that had also tried to access the same output will reassert their connection requests in the same clock cycle. The output arbitration logic is thus simultaneously presented with all the relevant connection requests, each with their correct priority and/or age and a good arbitration can be made to select the highest priority/oldest packet.

As the synchronization mechanism delays the removal of the blocked status from the output until the next point at which a synchronization signal causes all the previously rejected connection requests to be reasserted, a new input request is prevented from asserting its new request in the short window between the blocked status being removed and all the other previously blocked requests reasserting their requests at the synchronization point. This prevents connection by default, as opposed to priority or age.

In one version of this embodiment, such as a network switch in which arbitration logic is distributed over a small area of silicon, the output logic will use the synchronization signal to time the removal of the blocked status such that the signals coincide.

In a network switch in which arbitration logic is distributed over a large area of silicon, the request and response signals may take a number of clock cycles to meet the timing of the synchronization signal. As the arbiter has to select from a large number of physically distant inputs, each with its own priority and age value, several clock cycles will pass while the arbiter correctly evaluates the highest priority/age combination, typically, the arbitration logic in the output will be pipelined. For implementation in such a network switch, one embodiment of the synchronization mechanism ensures that the timing of the release of the blocked signal from the output occurs a few clock cycles after the reassertion of the request signals by some small number of cycles. This offset of clock cycles between the reassertion of previously rejected signals and release of the blocked signal will be consistent each time the synchronization signal is issued and will be of a size to accommodate the physical aspects of the chip in which the synchronization mechanism is being implemented.

In another embodiment of the synchronization mechanism, a feedback mechanism is provided which enables the arbiter to identify the highest priority/oldest connection requests and if an input connection request has a lower priority or is younger than the request which has the current highest priority/oldest input request the lower priority or younger request will be disabled. The complexity of the feedback mechanism can vary depending on the switch in which the mechanism is implemented and, depending on its complexity, could take many cycles to fully evaluate all the input values.

In use, from the point of view of the flow control, the assertion of blocked status is time critical. If the time it takes to assert the block value cannot be guaranteed then there is a possibility that the input buffer at the far end of the link could overflow. If this was to occur then packet data would be lost. However, the removal of the blocked status is less time critical. Removal of the blocked status will either occur actively after space has been created in the link partners input buffer and it had returned a start signal or passively after space has been created in the link partners input buffer and it had not repeated the Xoff instruction. The advertising of the removal of the blocked status to the outputs can usually be slightly delayed without any bandwidth penalty as the filling input buffers that caused the original blocked status will normally be able to supply a continuous stream of data for a little longer without becoming empty.

In the network switch detailed above, inputs 112*a, b* and *c* will continue to assert their request until either the request is accepted or the request has been rejected. However, in a further embodiment of the synchronization mechanism, the mechanism enables a communication request to remain asserted while the tail of the previous data packet being transmitted on the output is being cleared or while other inputs connection requests are selected first for connection.

When a new communication request arrives at an output which is currently idle the request can be accepted immediately without spending much effort in evaluating the input requests priority and/or age value. In this case the input is accepted without waiting for the priority/age selection to fully settle because it is unlikely that two or more requests of different priority would arrive at exactly the same time trying to connect to an output that has been idle for some time. It fact it is quite possible that a link has been idle for some time and a single low priority request arrives that should be immediately accepted and connected by the output. In the next or subsequent cycles a high priority request could arrive only to find that the output is already connected to the low priority request. Clearly there is no point in delaying the acceptance of the low priority request in the hope that a high priority request might arrive because it is also highly likely that only low priority requests exist in the network at this time. However, in cases where an input connection request has remained asserted whilst waiting for the output to clear the tail end of a previous packet, there is a good chance that other requests from other inputs will appear while the request is waiting. In this case it is very important that the highest priority request is the next to be accepted by the output. The connection time of the previous packet can be used to correctly evaluate the next highest priority request. The priority/age selection mechanism can be evaluating while the tail of the previous packet is being sent so that the correct decision is made on the next arbitration.

In a further extension to the idea the priority qualification logic that is able to mask out requests before they are applied to the fair arbiter can change its behavior after it has had to signal a blocked status back to the inputs.

However, if the requests have been actively de-asserted because the output they were targeting had been marked as "blocked" then when the synchronization signal indicates to the input ports to reassert their request simultaneously many requests with probably different priority values would be presented to the output arbiter together. Clearly this is a different situation from the output port being idle before new request arriving. Therefore the priority selection mechanism should be actively enforced and a new connection to the output should be prevented until the priority selection mechanism has had enough time to identify the highest priority and/or oldest requesting input ports. The synchronization mechanism will not use the request pending mechanism once an output has been blocked as when a blockage occurs it is highly likely that many requests will be presented together and the priority/age selection should be allowed to settle before an arbitration to select one is made. The output port will notify the output arbiter that a blocked signal had been asserted and force a full evaluation of the priority and age values for all connection requests to the previously blocked output channel or data lane. If a blocked signal has not been asserted since the last arbitration of this output channel or data lane, the output arbiter will enable a fast arbitration.

Various modifications can be made to the embodiments hereinbefore described without departing from the scope of the invention. For example, it will be appreciated that much bigger crossbars can be constructed with many more inputs and outputs and wide data paths can be used to increase the bandwidth increasing the size of the crossbar structure and the synchronization mechanism is suitable for implementation regardless of the crossbar structure. The synchronization signal has been described as being transmitted using a globally available, chip wide, signal wire. However, it could also be achieved, for example, with a set of synchronized timers.

The invention claimed is:

1. A method for controlling data packet routing through a switching element having a first plurality of input ports and a second plurality of output ports, the method comprising the steps of:
    detecting issuance of a first congestion indicator from an output port of the switching element, the first congestion indicator relating to a first routing request from a first input port of the switching element;
    allowing reassertion of the first routing request after a first time period;
    detecting issuance of a second congestion indicator from the output port of the switching element, the second congestion indicator relating to a second routing request from a second input port of the switching element;
    allowing reassertion of the second routing request after a second time period, wherein the first and second time periods are such that reassertions of the first and second connection requests occur substantially simultaneously.

2. A method as claimed in claim 1, wherein the reassertions of the first and second routing requests occur in a single clock cycle.

3. A method as claimed in claim 1, further comprising generating respective synchronization signals for the reassertion of the first and second routing requests.

4. A method as claimed in claim 1, wherein the first and second congestion indicators are generated in dependence upon a link status signal relating to congestion of a link from the output port concerned, and wherein the method further comprises delaying expiry of the link status signal until the end of the first and second time periods.

5. A method as claimed in claim 1, further comprising determining an allowed route from the reasserted first and second routing requests in dependence upon a parameter relating to the routing requests.

6. A method as claimed in claim 5, wherein the parameter includes a priority level.

7. A method as claimed in claim 5, wherein the parameter includes a request age.

8. A method as claimed in claim 5, wherein the parameter is ignored if no congestion indicators had been given on the previous routing request from an input.

9. A device for controlling data packet routing through a switching element having a first plurality of input ports and a second plurality of output ports, the device comprising:
    a detector configured to detect issuance of a first congestion indicator from an output port of a switching element, the first congestion indicator relating to a first routing request from a first input port of the switching element; and
    a controller configured to allow reassertion of the first routing request after a first time period;
    wherein the detector is configured to detect issuance of a second congestion indicator from the output port of the switching element, the second congestion indicator relating to a second routing request from a second input port of the switching element;
    and wherein the controller is configured to allow reassertion of the second routing request after a second time period, and wherein the first and second time periods are such that reassertions of the first and second connection requests occur substantially simultaneously.

10. A device as claimed in claim 9, wherein the controller is further configured to cause such reassertions of the first and second routing requests occur in a single clock cycle.

11. A device as claimed in claim 9, further comprising a synchronization pulse generator configured to generate respective synchronization signals for the reassertion of the first and second routing requests.

12. A device as claimed in claim 9, wherein the first and second congestion indicators are generated in dependence upon a link status signal relating to congestion of a link from the output port concerned, and wherein the device further comprises a delay unit configured to delay expiry of the link status signal until the end of the first and second time periods.

13. A device as claimed in claim 9, wherein the controller is further configured to determine an allowed route from the reasserted first and second routing requests in dependence upon a parameter relating to the routing requests.

14. A device as claimed in claim 13, wherein the parameter includes a priority level.

15. A device as claimed in claim 13, wherein the parameter includes a request age.

16. A device as claimed in claim 13, wherein the parameter is ignored if no congestion indicators had been given on the previous routing request from an input.

* * * * *